US005659134A

United States Patent [19]

Tanaka et al.

[11] Patent Number: 5,659,134

[45] Date of Patent: Aug. 19, 1997

[54] METHOD FOR DETECTING ABNORMALITIES IN A CRANK ANGLE SENSOR AND APPARATUS FOR DETECTING ABNORMALITIES IN A CRANK ANGLE SENSOR

[75] Inventors: Toru Tanaka; Tatsuhiko Takahashi, both of Tokyo-to, Japan

[73] Assignee: Mitsubishi Denki Kabushiki Kaisha, Tokyo, Japan

[21] Appl. No.: 575,392

[22] Filed: Dec. 20, 1995

[30] Foreign Application Priority Data

Aug. 29, 1995 [JP] Japan .................................... 7-220330

[51] Int. Cl.[6] .......................... F02D 45/00; G01M 15/00

[52] U.S. Cl. ...................... 73/118.1; 73/117.3; 73/118.2; 123/419; 123/436; 364/431.03; 364/431.07

[58] Field of Search .................................... 73/116, 117.2, 73/117.3, 118.1; 364/431.03, 431.07; 123/419, 436

[56] References Cited

U.S. PATENT DOCUMENTS

| | | | |
|---|---|---|---|
| 4,502,446 | 3/1985 | Kanegae et al. | 123/479 |
| 4,788,956 | 12/1988 | Suzuki et al. | 73/116 |
| 5,044,336 | 9/1991 | Fukui | 73/116 |
| 5,197,325 | 3/1993 | Tamura et al. | 73/117.3 |
| 5,305,220 | 4/1994 | Schöggl | 73/117.3 |
| 5,377,535 | 1/1995 | Angermaier et al. | 73/116 |
| 5,497,748 | 3/1996 | Ott et al. | 73/116 |

FOREIGN PATENT DOCUMENTS 681706 3/1994 Japan .

*Primary Examiner*—George M. Dombroske

*Attorney, Agent, or Firm*—Sughrue, Mion, Zinn, Macpeak & Seas

[57] ABSTRACT

To improve the reliability and detecting capability of an apparatus for detecting abnormalities in a crank angle sensor, the apparatus comprises detection keeping devices which assumes that there is an air weight flow higher than a predetermined value for a predetermined interval after an output of the air volume sensor has fallen below a predetermined value, to enable abnormalities in the crank angle sensor to be detected with greater accuracy in spite of variations in air volume during cranking of the engine or after stopping of the engine.

4 Claims, 10 Drawing Sheets

METHOD FOR DETECTING ABNORMALITIES IN A CRANK ANGLE SENSOR AND APPARATUS FOR DETECTING ABNORMALITIES IN A CRANK ANGLE SENSOR

BACKGROUND OF THE INVENTION

1. [Field of the Invention]

This invention relates to a method for detecting abnormalities in a crank angle sensor that generates a reference angle signal for each reference angle according to a the revolution of an internal combustion engine, and to an apparatus for detecting such abnormalities.

2. [Prior Art]

Japanese Laid-open Patent Application No. 6-81706 discloses an apparatus for detecting abnormalities in a crank angle sensor of the prior art.

As shown in FIG. 7, this apparatus comprises an air volume sensor 1 for detecting an amount of intake air, a crank angle sensor 2 for generating a reference angle signal for each reference angle according to the revolution of an internal combustion engine, and a control unit 10 that includes means 11 for detecting abnormalities in the crank angle sensor and flow detection means 12 for determining whether the engine is running, and detects abnormalities in the crank angle sensor based on outputs from these sensors.

A description is subsequently given of the operation of the apparatus as follows.

When a starter switch is turned on, a starter rotates, and the internal combustion engine starts revolving. At this time, an output of the air volume sensor 1, as shown in FIG. 8, changes from an initial state value C when the engine is not operating to a normal output value when air is absorbed by the revolution of the engine. At this point, the flow detection means 12 for detecting the amount of intake air judges that the engine is definitely running when an output value from the air volume sensor 1 is larger than a predetermined value X (which is set larger than the initial state value C and smaller than the minimum output value B at the time of cranking). If the flow detection means 12 judges that the engine is definitely running, the routine proceeds to the detection of abnormalities in the crank angle sensor. If the crank angle sensor 2 is in good order, a crank angle pulse corresponding to a predetermined crank angle is applied to the means 11 for detecting abnormalities in the crank angle sensor, which then judges that the crank angle sensor is in good order. However, if the crank angle sensor is out of order, the crank angle pulse is not applied to the means 11 for detecting abnormalities in the crank angle sensor. Instances in which a crank angle pulse is not detected on a temporary basis due to a short break caused by some reason or are taken into account in the prior art apparatus. If a crank angle pulse is not detected, the crank angle sensor is not immediately judged to be out of order, but if a crank angle pulse is not detected for a predetermined interval (an elapsed time 2 of one second, for example), the crank angle sensor is judged to be out of order.

In the above apparatus of the prior art, the predetermined value X, which is a decision value for the means 12 for detecting the amount of intake air, must be set within the range that satisfies value C<predetermined value X<value B. However, the difference between value C and value B is generally small (about 0.4 V or less) as shown in FIG. 9. Moreover, the output of the sensor is affected by the temperature and density of intake air, supply voltage and other factors, and errors are caused by differences among mass-produced sensors. It is therefore generally difficult to set a predetermined value that is between value C and value B.

When the electromotive force of the battery falls at low temperatures or when the battery is weak, the waveform shown in FIG. 10 is obtained as an output of the air volume sensor when a starter is rotated and the engine starts cranking. In this case, as is evident from FIG. 10, since value C≧value B, it is impossible to set a predetermined value X that is larger than value C and smaller than value B. Even when the predetermined value is set to any value larger than value C, detection is omitted. In other words, since the predetermined value cannot be set smaller than value C, a value of the output waveform is smaller than the predetermined value within the trough of the output waveform of FIG. 10. Therefore, a timer for counting the elapsed time 2 is reset each time a trough appears in the output waveform and detection of abnormalities is never carried out, i.e., detection is omitted.

When the engine operates during a drive, and then stops for some reason or another, there is a residual negative pressure in the duct or the like. Therefore, though the engine stops, air is sucked in until the negative pressure disappears. The result, as shown in FIG. 11, is the generation of a signal indicating the erroneous existence of air flow by the air volume sensor. Thereby, erroneous abnormality detection is made. In other words, in the prior art, if an output value of the air volume sensor 1 is larger than the predetermined value X, the engine is judged to be definitely running and the routine proceeds to the detection of abnormalities in the crank angle sensor 2. Therefore, when the engine stops and an output of the air volume sensor 1 is higher than the predetermined value X due to the existence of negative pressure, the routine for detecting abnormalities in the crank angle sensor 2 is initiated, and the detection is made according to the presence or absence of an output from the crank angle sensor 2. At this point, since there is no output from the crank angle sensor 2, the crank angle sensor 2 is judged to be out of order even when it is not.

In the end, the apparatus for detecting abnormalities in a crank angle sensor of the prior art suffers from low reliability. For example, when the engine stops during a drive, the crank angle sensor is improperly judged to be out of order even when the sensor is actually in good order (erroneous detection), or when the temperature is low or the battery weak, the apparatus cannot detect abnormalities (detection omission).

SUMMARY OF THE INVENTION

According to the present invention a method for detecting abnormalities in a crank angle sensor is provided in which a predetermined value is set to a value between an output value of the means for detecting the state of intake air when the internal combustion engine is not running and the maximum output value of the means for detecting the state of intake air during cranking of the internal combustion engine by the starter, and during a predetermined interval after the output value of the means for detecting the state of intake air has fallen below the predetermined value, the output value of the means for detecting the state of intake air is considered to have remained above the predetermined value.

An apparatus is also provided according to the present invention for detecting abnormalities in a crank angle sensor. The apparatus includes means for detecting the state of intake air, a crank angle sensor for generating a reference pulse for each reference angle according to the revolution of the internal combustion engine, means for detecting abnormalities in the crank angle sensor based on outputs from the means for detecting the state of air intake and from the crank angle sensor, and control means which affects the detection of abnormalities in the crank angle sensor during a predetermined interval after an output value of the means for detecting the state of intake air falls below a predetermined value that is between an output value of the means for detecting the state of intake air when the internal combustion engine is not running and the maximum output value of the means for detecting the state of intake air when the internal combustion engine is cranked by the starter.

According to another embodiment of the present invention an apparatus is provided for detecting abnormalities in the crank angle sensor. The apparatus includes means for detecting the state of intake air, a crank angle sensor, means for detecting abnormalities in the crank angle sensor, and control means which prevents the detection of abnormalities in the crank angle sensor when stopping of the internal combustion engine is detected.

The above and other objects, features and advantages of the invention will become more apparent from the following description when taken in conjunction with the accompanying drawings.

DESCRIPTION OF THE PREFERRED EMBODIMENT

Embodiment 1

Figure 1:
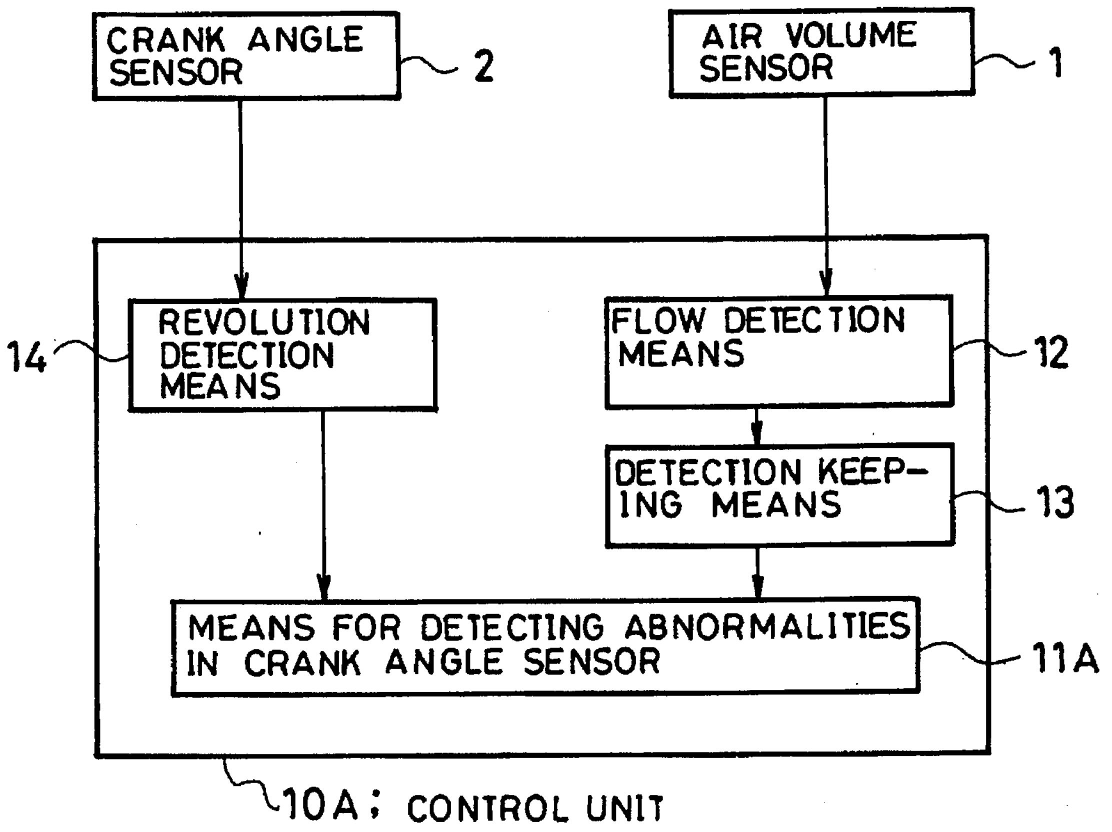
FIG. 1 is a block diagram of an apparatus for detecting abnormalities in a crank angle sensor according to the present invention.

FIG. 1 is a block diagram of an apparatus for detecting abnormalities in a crank angle sensor according to Embodiment 1 of the present invention. The apparatus of Embodiment 1 comprises an air volume sensor 1 for detecting the state of intake air, a crank angle sensor 2 for generating a reference pulse for each reference angle according to the revolution of an internal combustion engine, crank angle sensor abnormality detection means 11A as means for detecting abnormalities in the crank sensor based on outputs from the air volume sensor 1 and the crank angle sensor 2, flow detection means 12 for determining whether or not an output value of the air volume sensor 1 is normal, i.e., whether or not the output value is larger than a predetermined value to be described later, detection keeping means 13 which assumes an output value of the air volume sensor 1 to be normal during a predetermined interval after an output value of the air volume sensor 1 falls below a predetermined value when the internal combustion engine is being cranked by a starter, and revolution detection means 14 which determines whether or not there is an output from the crank angle sensor 2. The means denoted at 11A to 14 constitute a control unit 10A which executes a program outlined in the flow charts of FIG. 2 and FIGS to 6.

A description is subsequently given of the process for detecting abnormalities in the crank angle sensor by means of the control unit 10A with reference to FIGS and 3 according to this Embodiment 1.

Figure 9:
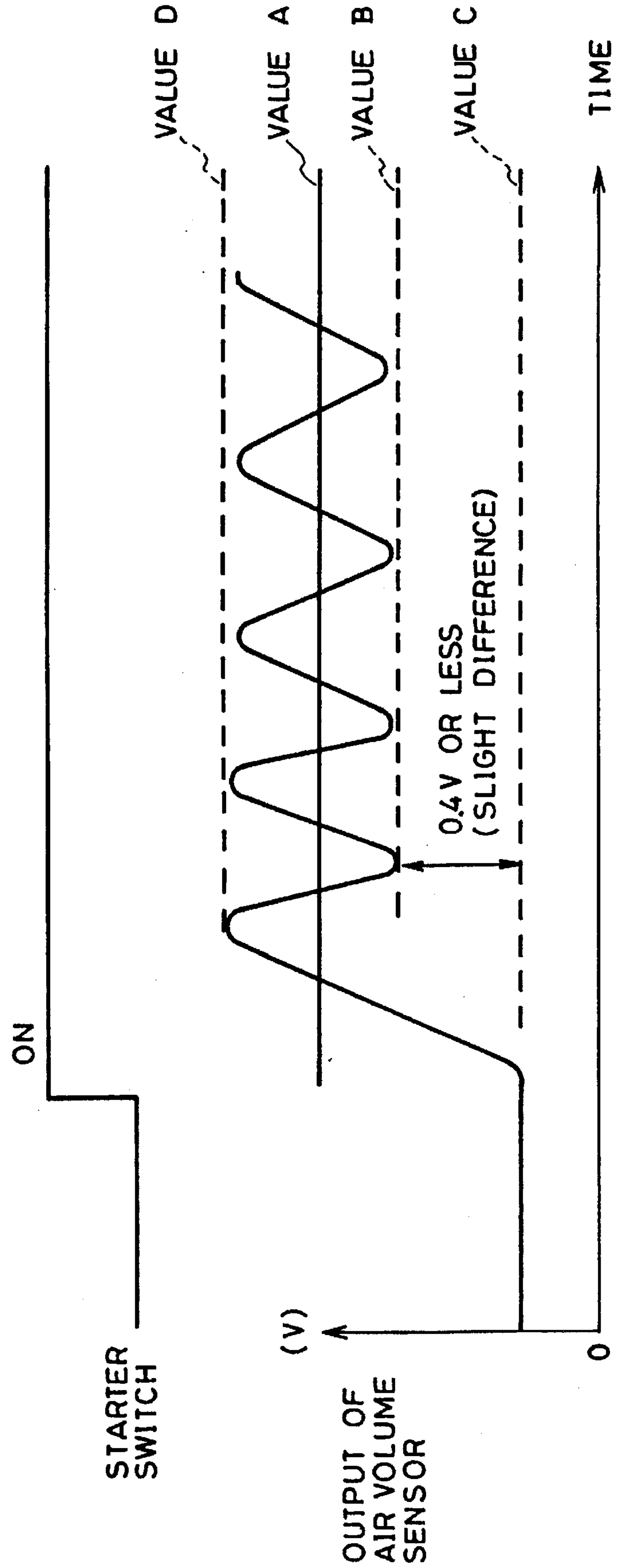
FIG. 9 is a time chart showing an output of an air volume sensor at the time of cranking.
Figure 10:
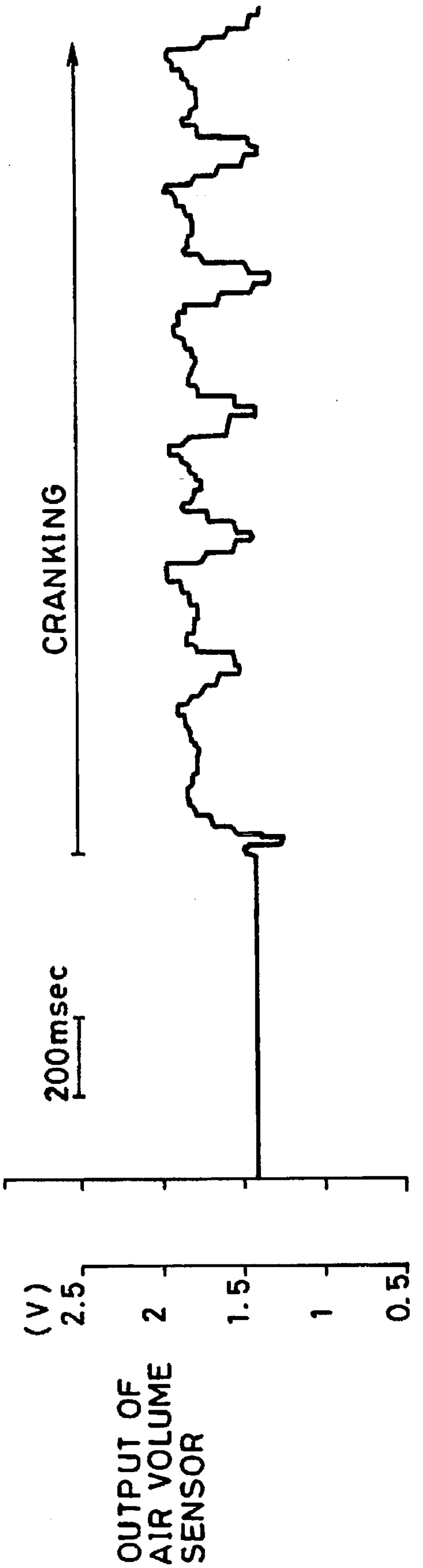
FIG. 10 is a time chart showing an output of an air volume sensor at the time of cranking at low temperatures.

First, the current air weight flow is compared with a predetermined value K1 in step S1. This predetermined value is set to a value A, for example, between value C and value D as shown in FIG. 9. That is, the predetermined value is set between an output value (value C of FIG. 9) of the air volume sensor 1 when the internal combustion engine is not running and the maximum output value (value D of FIG. 9) of the air volume sensor 1 when the internal combustion engine is being cranked by a starter. When the current air weight flow is larger than K1, the routine proceeds to step S21 to set a counter 1 to a certain constant T1. Reversely, when the current air weight flow is smaller than K1, the counter 1 is decremented by one in step S22.

After step S21 or S22 is carried out, the routine proceeds to step S3 to determine whether or not there is a signal from the crank angle sensor. When there is a signal from the sensor, the counter 2 is set to a constant T2 in step S41 and the routine proceeds to step S5. When there is no signal from the crank angle sensor in step S3, the counter 2 is decremented by one in step S42 and the routine proceeds to step S5.

In step S5, a count value of the counter 1 is compared with "0". When the count value is larger than "0", the routine proceeds to step 6, and when the count value is "0", the routine proceeds to step S72. In step S6, a count value of the counter 2 is compared with "0". When the count value is "0", the routine proceeds to step S71, and when the count value is larger than "0", the routine proceeds to step S72. In step S71, a counter 3 is decremented by one and the routine proceeds to step S8. In step S72, the counter 3 is set to a constant T3 and the routine proceeds to step S8.

Figure 3:
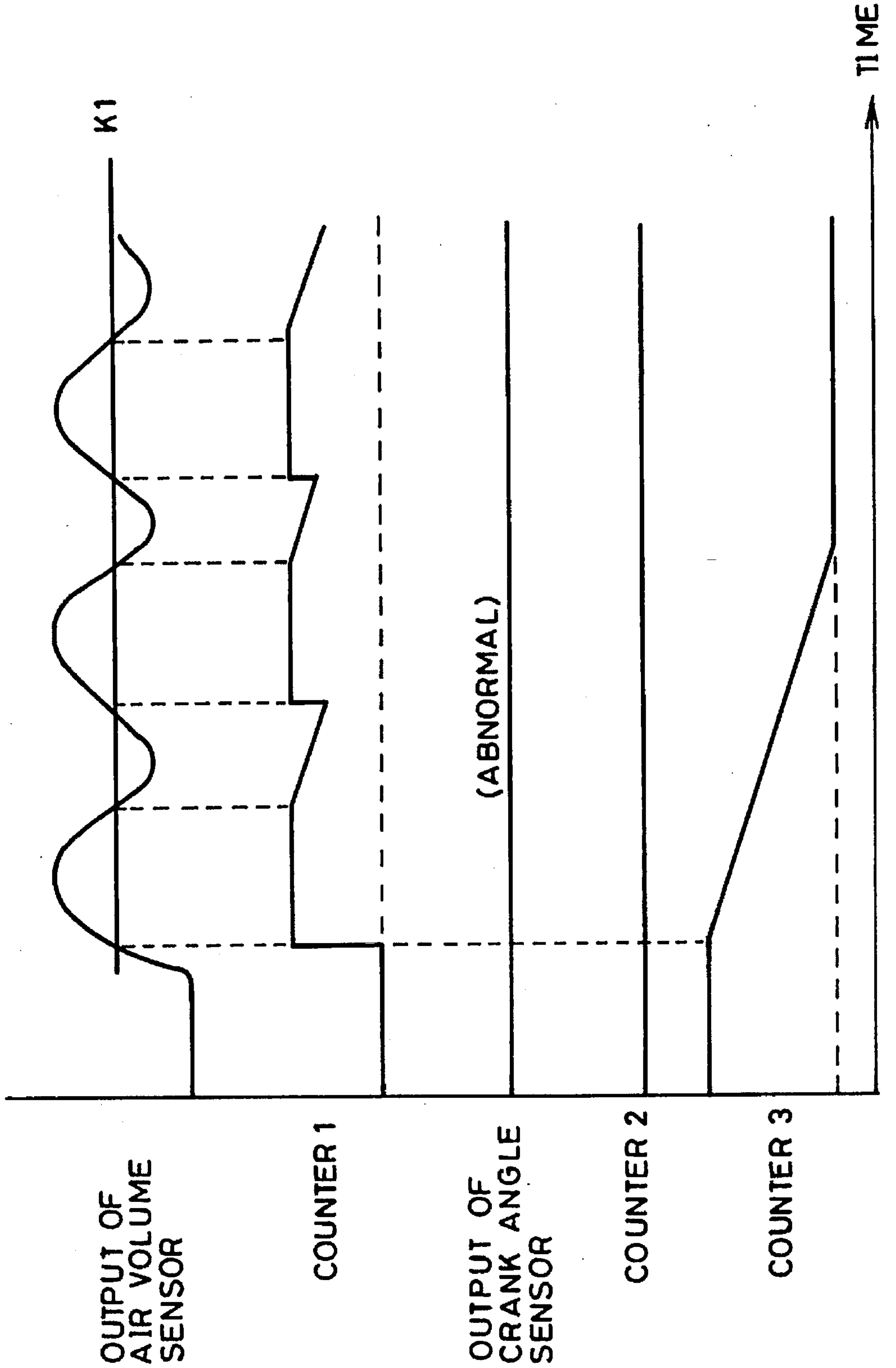
FIG. 3 is a time chart showing the operation of an apparatus for detecting abnormalities in a crank angle sensor according to the present invention.

In step S8, a count value of the counter 3 is compared with "0". When the count value is "0", the crank angle sensor is judged to be out of order in step S91 and the routine is completed. When the count value of the counter 3 is larger than "0", the crank angle sensor is judged to be in good order in step S92 and the routine is completed. FIG. 3 shows the above operation of the apparatus along a time axis.

A program for carrying out the above step S1 and the function of the control unit 10A for processing this program correspond to the flow detection means 12. The counter 3 is provided for the same purpose of a timer for counting an elapsed time 2 of the prior art and operates in the same manner as that of the prior art when a predetermined value has been set as in the prior art.

However, in the present invention, since the predetermined value K1 is set to a value at the center of the output waveform as shown in FIG. 3, for example, it is desirable for the counter 3 not to be set to T3 even when an output value of the sensor falls below the predetermined value K1 for a short time and for the sure detection of an abnormality when an output value of the sensor is larger or considered to be larger than the predetermined value K1 for an interval of time set to T3. Means for operating the counter 3 in this way is control means comprising the counter 1, the program for allowing the counter 1 to carry out steps S21, S22 and S5, and the function of the control unit 10A for processing the program.

Through this control means, the counter 3 counts "0" when a predetermined interval (equivalent to T3) elapses after an output value of the air volume sensor 1 rises above the predetermined value K1, an output value of the air volume sensor 1 does not remain lower than the predetermined value K1 for a predetermined interval (equivalent to T1), and there is no output from the crank angle sensor 2. That is, an abnormality in the crank angle sensor is detected.

Figure 2:
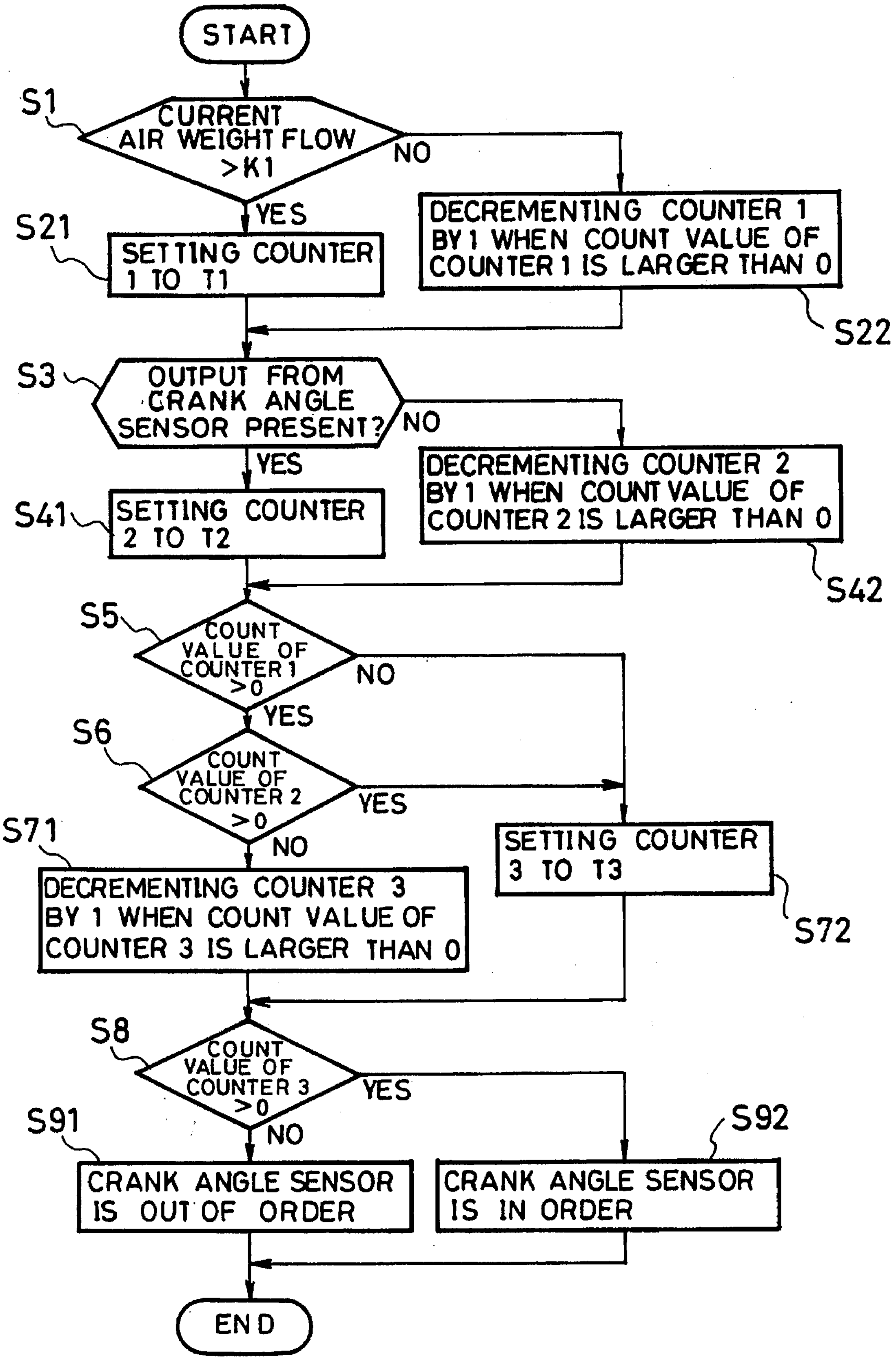
FIG. 2 is a flow chart showing an example of a processing flow of an apparatus for detecting abnormalities in a crank angle sensor according to the present invention.

If the counter 1 counts completely down from value T1 during an interval between troughs in the output waveform of FIG. 3, the counter 3 is reset to T3. To prevent this, T1 must be set to a value which the counter 1 does not count completely down from during an interval between troughs in the output waveform. That is, if the routine of FIG. 2 is carried out at intervals of 25 ms in accordance with a clock signal, T1 must be set to a value larger than the number of times the routine is carried out in one cycle of the output waveform (the number of clock signals) of FIG. 2.

The count-down operation of the counter 1 in step S22 is equivalent to the detection keeping means 13 which considers an output value of the air volume sensor 1 to be normal during a predetermined interval after the output value from the air volume sensor 1 falls below the predetermined value K1. Therefore, due to the operation of the counter 1, a count value of the counter 3 becomes "0" without being reset and thus abnormalities are detected with certainty.

The counter 2 is provided to prevent erroneous abnormality detection when the engine is stopped and is equivalent to revolution detection means 14 in step S3. The program for carrying out steps S3 and S6, the control unit 10A and the counter 2 constitute the control means which prevents the detection of an abnormality in the crank angle sensor by preventing information (that is, "0") that indicates an abnormality in the crank angle sensor 2 from being set in the counter 3 when stopping of the internal combustion engine is detected.

In concrete terms, this control means prevents the detection of an abnormality in the crank angle sensor for a predetermined interval after the internal combustion engine has stopped. In this case, T2 is the interval during which detection of an abnormality is prevented when the engine has stopped and no crank angle signal is input. As seen from FIG. 11, this interval must be about 5 seconds.

According to this Embodiment 1, since the difference between value D and value C shown in FIG. 9 is larger than the difference between value B and value C, which is the range set for the predetermined value X in the prior art, abnormality detection can be made more frequently and reliability is improved.

Figure 11:
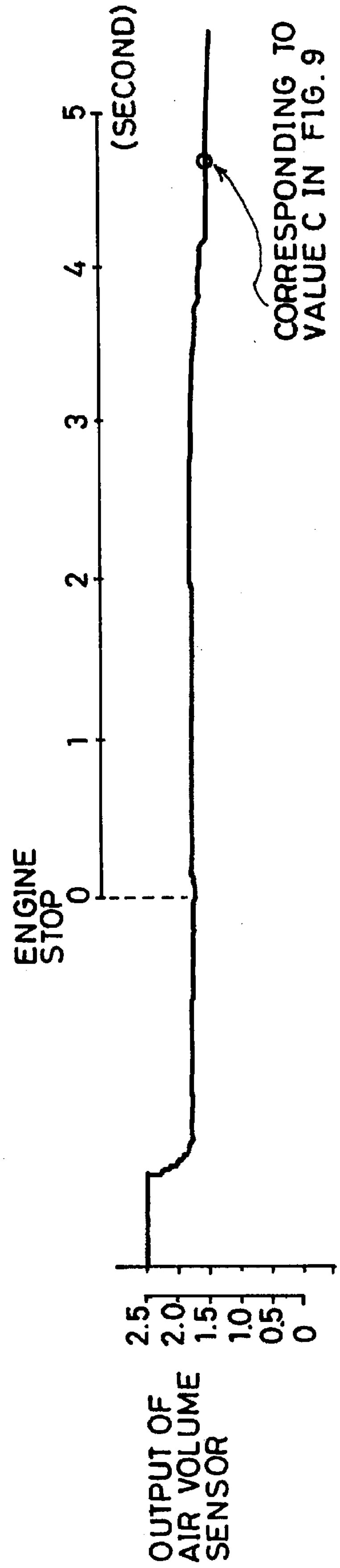
FIG. 11 is a time chart showing an output of an air volume sensor when an engine is stopped.

As shown in FIG. 11, when the engine stops during driving, an output value from the air volume sensor may exceed K1 due to residual negative pressure. In this case, erroneous abnormality detection is prevented by the counter 2.

Figure 4:
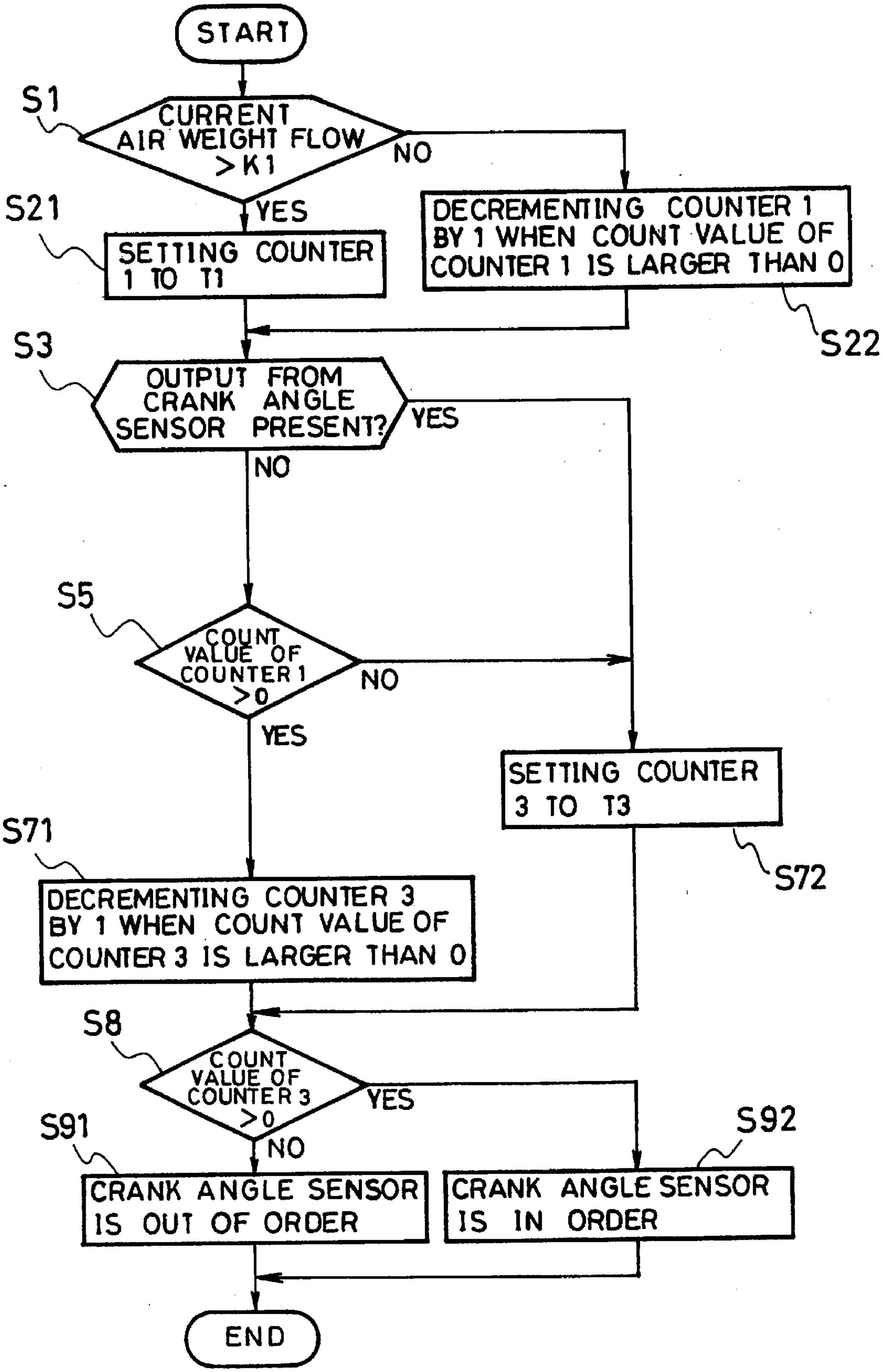
FIG. 4 is a flow chart showing an example of a processing flow of an apparatus for detecting abnormalities in a crank angle sensor according to the present invention.

The counter 2 is used in the above Embodiment, but it need not be used. A processing method which eliminates the use of the counter 2 is shown in FIG. 4.

In step S1, the current air weight flow is compared with a preset value K1. When the current air weight flow is larger than K1, the routine proceeds to step S21 to set the counter 1 to a certain constant T1. Reversely, when the current air weight flow is smaller than K1, the counter 1 is decremented by one in step S22. After step S21 or S22 is carried out, the routine proceeds to step 3 to check an output from the crank angle sensor. When there is an output from the sensor, the routine proceeds to step S72, and when there is no output, the routine proceeds to step S5. In step S5, a count value of the counter 1 is compared with "0". When the count value is larger than "0", the routine proceeds to step S71, and when the counter value is "0", the routine proceeds to step S72. In step S71, the counter 3 is decremented by one, and the routine moves to step S8. In step S72, the counter 3 is set to a constant T3, and the routine moves to step S8.

In step S8, a count value of the counter 3 is compared with "0". When the count value is "0", the crank angle sensor is judged to be out of order in step S91 and the routine is completed. When the count value is larger than "0", the crank angle sensor is judged to be in order and the routine is completed. This Embodiment is equivalent to a structure which includes the detection keeping means in addition to the elements of the prior art.

Figure 5:
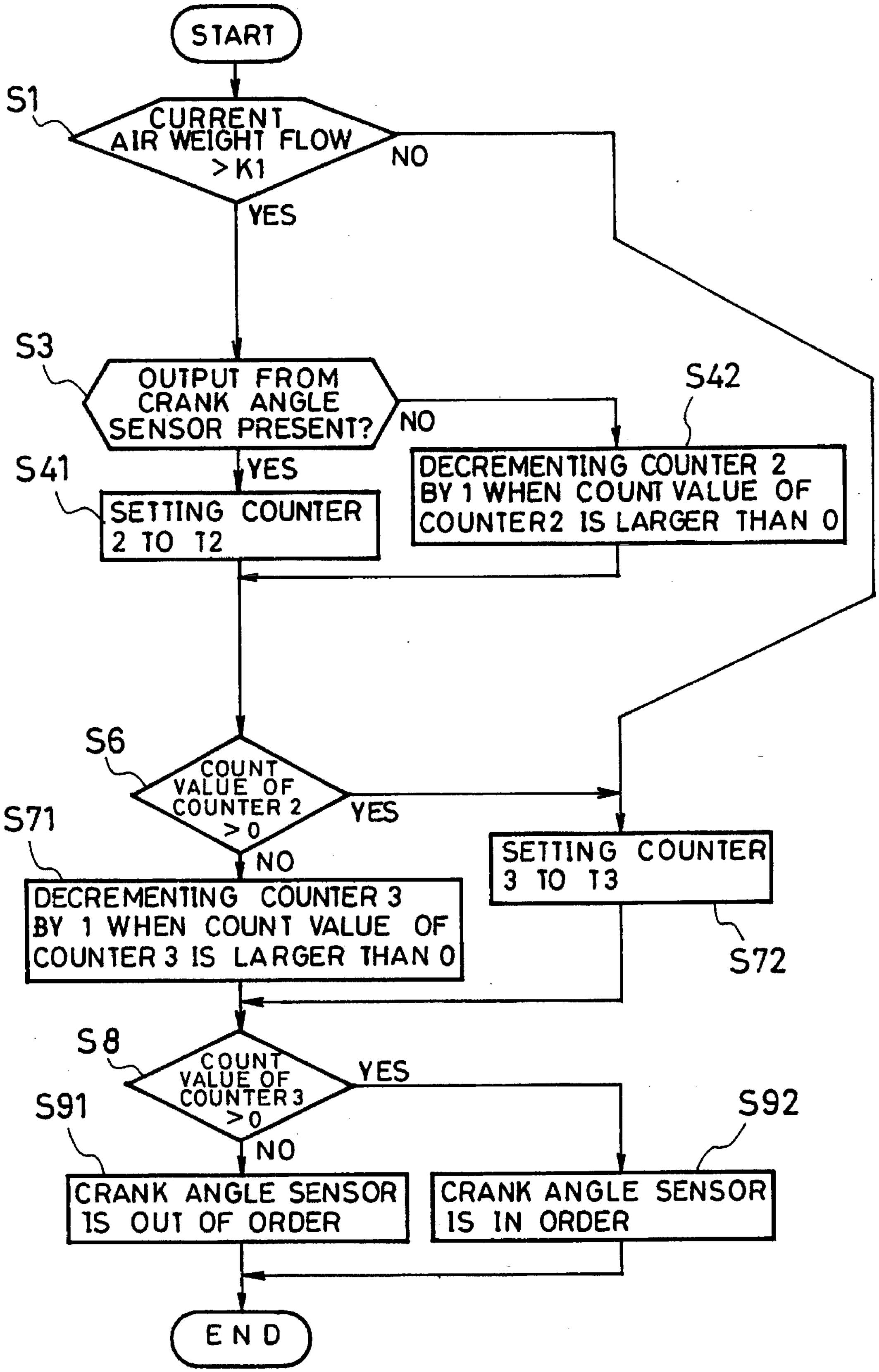
FIG. 5 is a flow chart showing an example of a processing flow of an apparatus for detecting abnormalities in a crank angle sensor according to the present invention.

A flow chart for the detection of abnormalities in the crank angle sensor when only the revolution detection means is added to the prior art is shown in FIG. 5. In step S1, the current air weight flow is compared with a preset value K1. When the current air weight flow is larger than the constant K1, the routine proceeds to step S3 and when smaller than the constant K1, the routine proceeds to step S72. In step S3, the presence of an output from the crank angle sensor is checked. When there is an output, the counter 2 is set to T2 in step S41. On the other hand, when there is no output, the routine proceeds to step S42 to decrement the counter 2 by one. After step S41 or S42 is carried out, a count value of the counter 2 is compared with "0" in step S6. When the count value is larger than "0", the routine proceeds to S72 to set the counter 3 to T3. When the count value is "0", the routine proceeds to step S71 to decrement the counter 3 by one. After step S71 or S72, a count value of the counter 3 is compared with "0" in step S8. When the count value is larger than "0", the routine proceeds to step S92 to judge the crank angle sensor to be in order and the routine is completed. When the count value is "0", the crank angle sensor is judged to be out of order and the routine is completed.

In this Embodiment, when the engine stops during engine operation, erroneous abnormality detection caused by residual negative pressure as in the prior art is eliminated.

An alternative method for preventing erroneous abnormality detection by adding revolution detection means is as follows.

Figure 6:
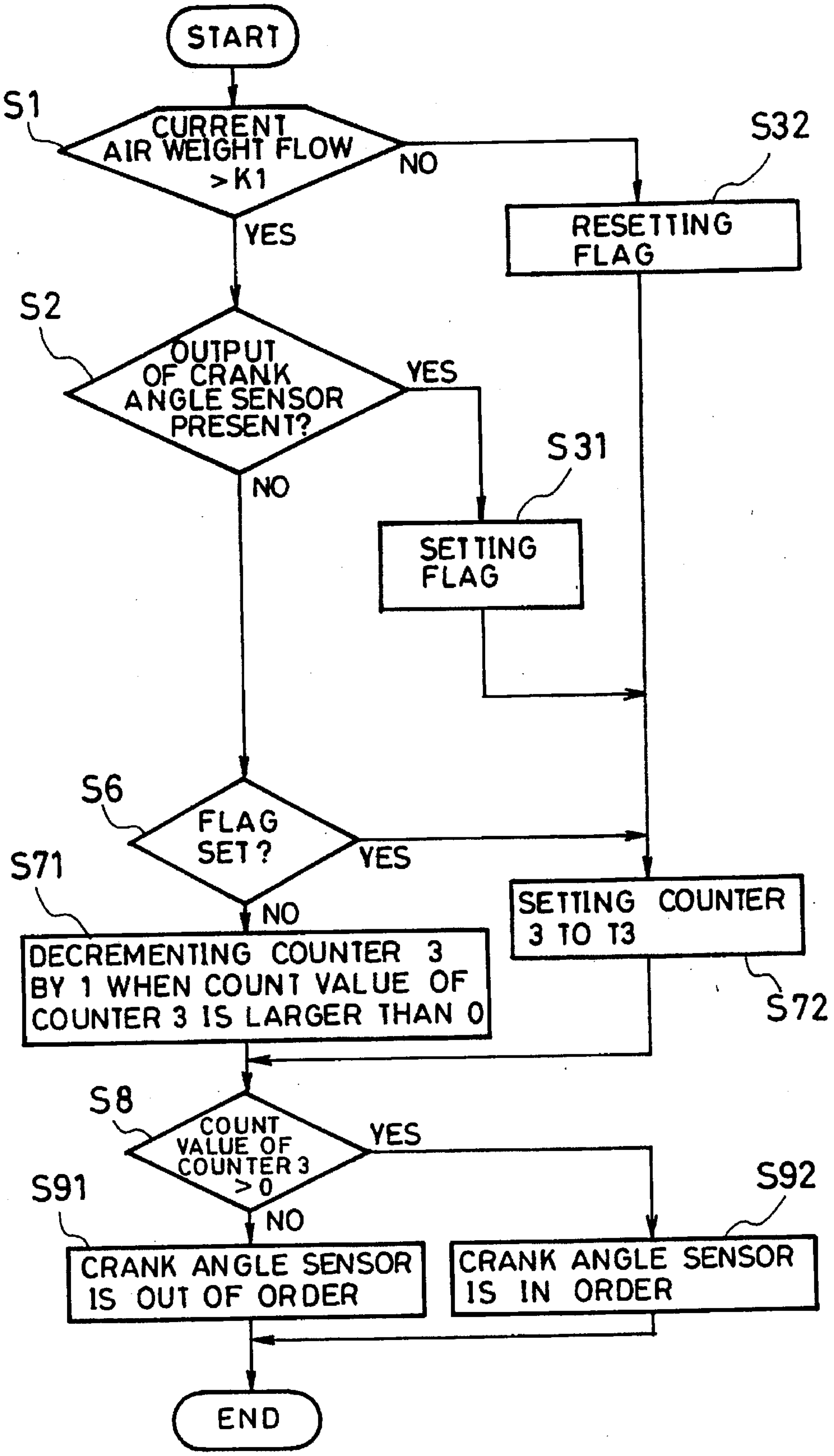
FIG. 6 is a flow chart showing an example of a processing flow of an apparatus for detecting abnormalities in a crank angle sensor according to the present invention.
Figure 7:
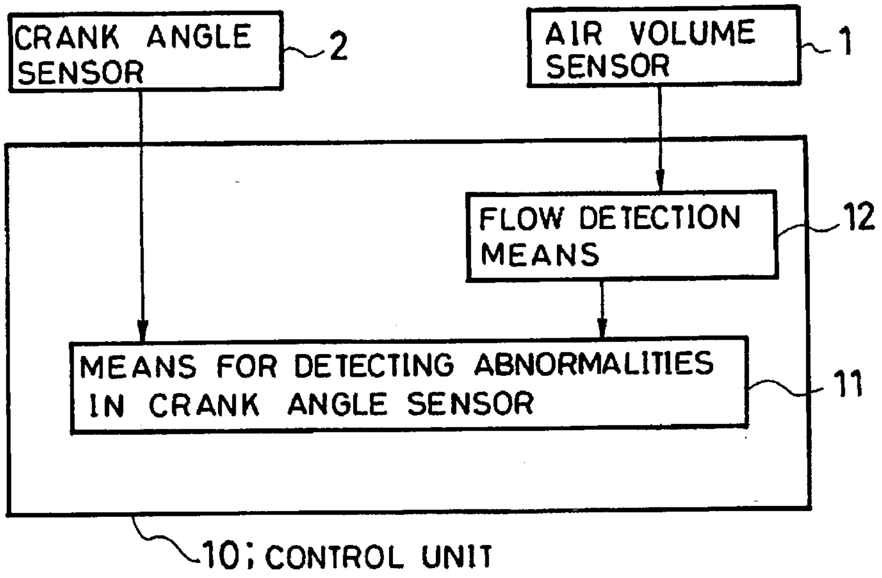
FIG. 7 PRIOR ART
FIG. 7 is a block diagram of an apparatus for acting abnormalities in a crank angle sensor of the prior art.
Figure 8:
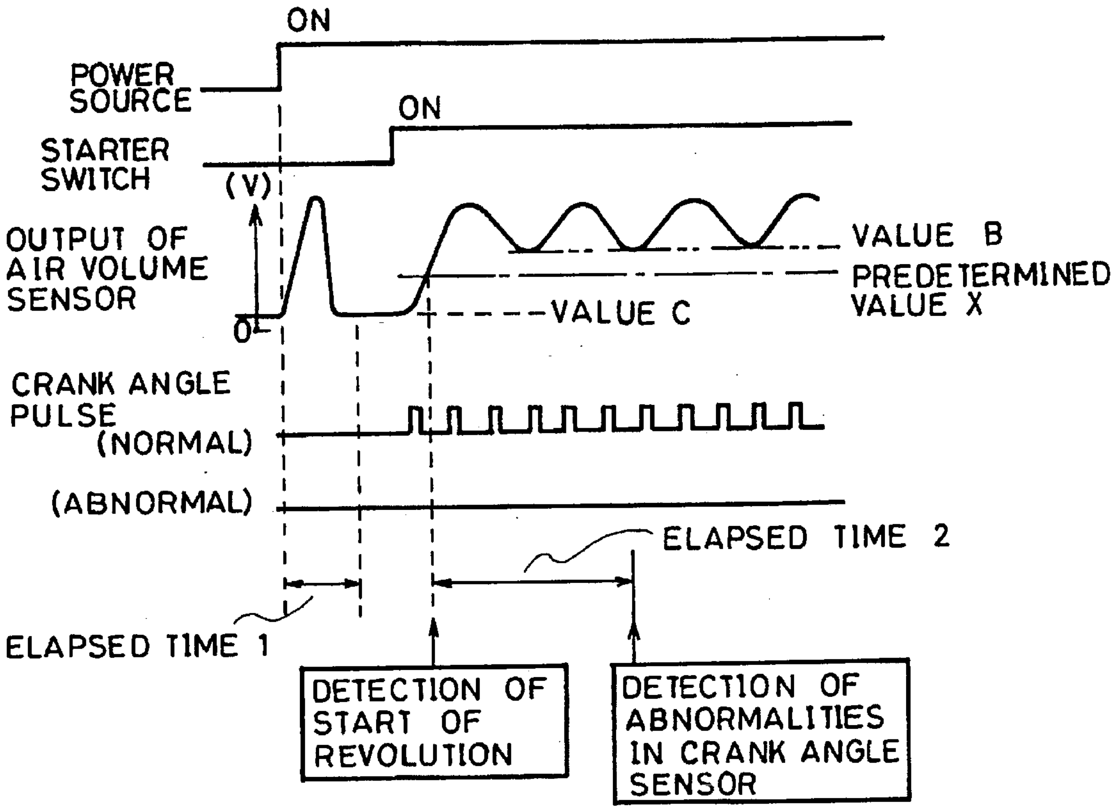
FIG. 8 PRIOR ART
FIG. 8 is a timing chart showing the operation of an apparatus for detecting abnormalities in a crank angle sensor of the prior art.

As shown in FIG. 6, the routine starts and the current air weight flow is compared with a preset value K1 in step S1. When the current air weight flow is larger than the constant K1, the routine proceeds to step S2; otherwise, the routine proceeds to step S32. In step S2, the presence of an output from the crank angle sensor is checked. When there is an output, the routine proceeds to step S31; otherwise, the routine proceeds to step S6.

In step S31, a flag is set and the routine proceeds to step S72. In step S32, the flag is reset and the routine proceeds to step S72.

In step S6, the state of the flag is checked. When the flag has been reset, the routine moves to step S71, and when it has been set, the routine moves to step S72. In step S71, the counter 3 is decremented by one and the routine proceeds to step S8. In step S72, the counter 3 is set to a certain constant T3 and the routine proceeds to step S8.

In step S8, a count value of the counter 3 is compared with "0". When the count value is "0", the crank angle sensor is judged to be out of order in step S91 and the routine is completed. When the count value is larger than "0", the crank angle sensor is judged to be in good order in step S92 and the routine is completed.

In this Embodiment, since detection of abnormalities in the crank angle sensor is prevented during the interval from the time when the internal combustion engine stops to the time when an output from the air volume sensor falls below the predetermined value, a flag is used for processing.

In this way, erroneous abnormality detection in the case of FIG. 11 can be prevented. In this Embodiment, revolution detection means is added, but it can be combined with detection keeping means to obtain the same effect as in the method illustrated in FIG. 2.

What is claimed is:

1. A method for detecting abnormalities in a crank angle sensor based on outputs from means for detecting a state of intake air and from a crank angle sensor which generates reference pulses for corresponding reference angles according to the revolution of an internal combustion engine, the method comprising the step of determining that there is no output from the crank angle sensor following a first predetermined time interval after an output value from the means for detecting a state of intake air rises above a predetermined value, wherein the predetermined value is set to a value between an output value of the means for detecting a state of intake air when the internal combustion engine is not running and the maximum output value of the means for detecting a state of intake air when the internal combustion engine is being cranked by a starter; and the output value of the means for detecting a state of intake air is considered to have remained above the predetermined value during a second predetermined time interval after the output value of the means for detecting a state of intake air falls below the predetermined value.

2. An apparatus for detecting abnormalities in a crank angle sensor comprising:

means for detecting a state of intake air;

the crank angle sensor for generating a reference pulse for each reference angle according to the revolution of an internal combustion engine;

means for detecting abnormalities in the crank angle sensor based on outputs from the means for detecting a state of intake air and the crank angle sensor; and control means which effects the detection of abnormalities in the crank angle sensor during a predetermined time interval after an output value of the means for detecting a state of intake air rises above a predetermined value set between an output value of the means for detecting a state of intake air when the internal combustion engine is not running and the maximum output value of the means for detecting a state of intake air when the internal combustion engine is being cranked by a starter if there is no output from the crank angle sensor.

3. An apparatus for detecting abnormalities in a crank angle sensor comprising:

means for detecting a state of intake air;

the crank angle sensor for generating reference pulses for corresponding reference angles according to the revolution of an internal combustion engine;

means for detecting abnormalities in the crank sensor based on outputs from the means for detecting a state of intake air and the crank angle sensor; and control means which prevents the detection of abnormalities in the crank angle sensor when stopping of the internal combustion engine is detected.

4. An apparatus for detecting abnormalities in a crank angle sensor according to claim 3, wherein said control means prevents the detection of abnormalities for a period sufficient to eliminate any negative pressure in a duct through which said intake air flows.

* * * * *